SELF-ADAPTIVE AMPLIFIER

Filed Feb. 28, 1968

GORDON D. LONG
INVENTOR
BY
BUCKHORN, BLORE, KLARQUIST & SPARKMAN
ATTORNEYS

United States Patent Office 3,529,252
Patented Sept. 15, 1970

3,529,252

SELF-ADAPTIVE AMPLIFIER

Gordon D. Long, Portland, Oreg., assignor to Tektronix, Inc., Beaverton, Oreg., a corporation of Oregon Filed Feb. 28, 1968, Ser. No. 708,838
Int. Cl. H03f 3/18; H03g 3/30
U.S. Cl. 330—13 10 Claims

ABSTRACT OF THE DISCLOSURE

An amplifier for driving cathode ray tube deflection plates or the like is adapted for normally operating at a low power level, but is also responsive to increased power requirements. When the amplifier does not provide sufficient current for insuring linear operation, means detect the state of the amplifier and provide additional standing current therefor. In a preferred form, the requirement for an increased output is detected in a feedback circuit and alters the amplifier bias so that an increased standing current is delivered to the amplifier.

BACKGROUND OF THE INVENTION

Figure 1:
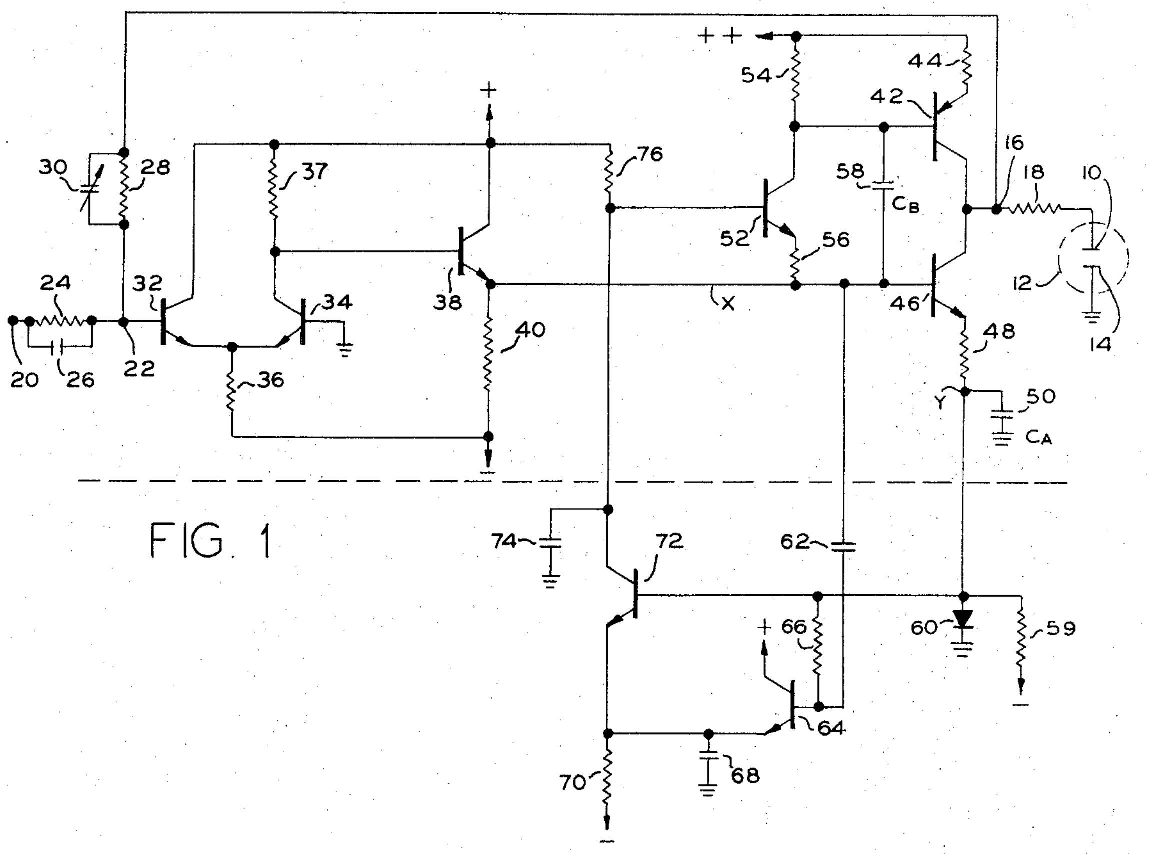

Generally, an amplifier designed for linear operation, such as the amplifier for driving vertical deflection plates of an oscilloscope cathode ray tube, is biased for Class A operation to provide best linearity. This means that the amplifier output stage must consume enough power to meet the driving power requirements for maximum frequency and amplitude conditions. Enough D.C. standing current is ordinarily supplied to provide for the highest bandwidth, maximum signal output that will ever occur in the amplifier. A continuous power dissipation takes place that increases the expense of power supply construction and operation. Moreover, when the power supply comprises batteries as in the case of portable equipment, battery life may be decreased.

Much of the time the amplification apparatus does not actually require all of the power conventionally made available for the extreme case. If the input signal frequency is low, for example, the displacement current necessary to charge the output capacitance of the amplification device plus load and stray capacitance is also low.

SUMMARY OF THE INVENTION

According to the present invention, an amplifier normally operates at a low power level, with the means biasing the amplifier normally establishing a low standing current. A temporary need for a larger standing current is detected, and the need is supplied, for example, when the linear capabilities of the amplifier are exceeded. In a particular embodiment of the present invention, an amplifier output stage comprises a pair of controlled devices biased for Class B operation wherein substantially only one of such devices conducts a relatively small current at a given time. Means detect when the output stage is not providing sufficient output, for example when an input signal exceeds the normal linear capabilities of the output stage. In response to such detection, further means increase the standing current to the amplifier output stage whereby proper operation is maintained. In a preferred embodiment of the present invention, feedback circuitry responsive to the condition of an output stage alters the bias of such output stage whereby sufficient standing current is provided.

It is an object of the present invention to provide an improved amplifier normally operating at a low power level and responsive to increased power requirements as the signal applied thereto demands.

It is a further object of the present invention to provide an improved amplifier exhibiting low power dissipation for linearly driving the vertical deflection plates of a cathode ray tube.

It is a further object of the present invention to provide an improved amplifier for driving a load over a wide range of amplitude, frequency, and bandwidth input signals without requiring that excessive power be supplied thereto and which is therefore suitable for portable or battery operation.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

Figure 2:
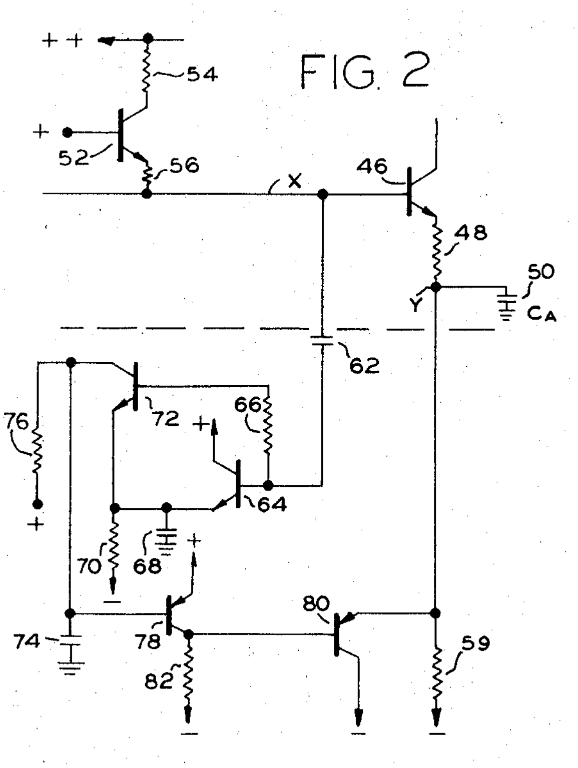

FIG. 1 is a schematic diagram of an amplifier circuit according to a preferred embodiment of the present invention; and FIG. 2 is a schematic diagram illustrating an alternative configuration for a portion of the FIG. 1 circuit.

DETAILED DESCRIPTION

Referring to the drawings, an amplifier according to the present invention is illustrated as driving a vertical deflection plate 10 of a cathode ray tube 12, wherein the remaining vertical deflection plate 14 is grounded. The amplifier is provided with an output terminal 16 coupled to plate 10 through resistor 18 and is further provided with an input terminal 20. The amplifier is desirably of the negative feedback type having its input terminal 20 coupled to a summing point 22 through the parallel combination of resistor 24 and capacitor 26, with a negative feedback circuit comprising resistor 28 in parallel with capacitor 30 coupling output terminal 16 to summing point 22. The time constant of resistor 28 and capacitor 30 is desirably equal to the time constant of resistor 24 and capacitor 26 to maintain proper operation at various frequencies.

Summing point 22 is connected to the base of NPN summing transistor 32, having its collector connected to a positive voltage and having its emitter connected to the emitter of grounded base NPN transistor 34. The emitters of both transistors 32 and 34 are returned through resistor 36 to a negative voltage. The collector of transistor 34 is connected to the base of NPN emitter follower transistor 38 and also to a positive voltage through load resistor 37. The collector of emitter follower transistor 38 is connected to a positive voltage point, while its emitter is returned to a negative voltage through resistor 40.

Emitter follower transistor 38 is employed to drive an output stage which desirably comprises a pair of controlled devices in circuit between positive and negative voltage terminals. Here these controlled devices comprise complementary transistors. A first of such devices comprises a PNP transistor 42 having its emitter coupled to a relatively high positive voltage point through resistor 44, and having its collector connected to amplifier output terminal 16. A second output stage control device here comprises NPN transistor 46 having its collector connected to output terminal 16 and its emitter coupled to a negative supply circuit through resistor 48. Resistors 44 and 48 are emitter degeneration resistors. The remote side of resistor 48 from the emitter of transistor 46 is coupled to ground through bypass capacitor 50 also designated $C_A$, with the junction between resistor 48 and capacitor 50 being designated by the letter Y.

The bases of transistors 42 and 46 are intercoupled by a third controlled device, here comprising transistor 52. The collector of transistor 52 is connected to the base of transistor 42 as well as through resistor 54 to the same relatively high positive voltage to which the emitter of transistor 42 was coupled, and the emitter of transistor 52 is coupled to the base of transistor 46 through resistor 56. A bypass capacitor 58, also designated $C_B$, is connected between the bases of transistors 42 and 46 to provide A.C. coupling therebetween. As a result of the action of transistor 52, as shunted by bypass capacitor 58, the input signal at the emitter of transistor 38 which is applied to the base of transistor 46 is also applied in the same phase to the base of transistor 42.

The output circuit comprising transistors 42 and 46 is efficacious in driving output terminal 16 substantially between the voltage levels to which the emitter terminals of transistors 42 and 46 are coupled. The transistors 42 and 46 conduct substantially alternately. One of the transistors 42 and 46 is nonconducting when the other conducts to a substantial extent, and therefore the operation of the output stage is nearly Class B. The general output circuit of the type comprising transistors 42, 46, and 52 is described and claimed in the copending application of John M. P. Gates, Ser. No. 708,855, filed Feb. 28, 1968, entitled "A Circuit for Driving an Output Terminal From One Voltage Level to Another," and assigned to the assignee of the present invention. This output circuit dissipates less power than the usual output driving stage inasmuch as no conventional large power dissipating load resistor is connected in series with transistors 42 and 46. Transistor 42 in the present circuit takes the place of the conventional load resistor. Even though this output stage has the property of reducing amplifier power dissipation as compared with the usual amplifier, the circuit according to the present invention further reduces amplifier power dissipation by reducing the standing current normaly supplied to the output stage, here comprising transistors 42 and 46, while increasing this current when necessary in a manner hereinafter more fully described.

The negative current supply to which point Y is connected includes a relatively large resistor 59 connected to a negative voltage point. Resistor 59 normally supplies a relatively small standing current to transistors 42 and 46. Also, diode 60 is interposed between point Y and ground, with the anode of the diode being connected to point Y.

Means illustrated below the dashed line for detecting when the output stage has exceeded its normal linear amplifying capabilities employs a capacitor 62 for coupling the base of a normally nonconducting NPN transistor 64 to a point X, point X being the junction between the emitter of transistor 38 and the base of transistor 46. The collector of transistor 64 is connected to a positive voltage and its base is also coupled through base resistor 66 to the anode of diode 60. The emitter of transistor 64 is shunted to ground through a first storage capacitor 68 while a resistor 70 connects the emitter of transistor 64 to a negative voltage. Also, the emitter of transistor 64 is connected to the emitter of NPN transistor 72, the base of which is connected to the anode of diode 60. The collector of transistor 72 is returned to ground through a second storage capacitor 74. In addition, the collector of transistor 72 is connected to the base of transistor 52, and through resistor 76 to a positive voltage point.

The FIG. 1 circuit, above the dashed line, operates to linearly drive output terminal 16, and therefore cathode ray tube plate 10, in accordance with the input signal applied at terminal 20. As in the case of the usual amplifier employing negative feedback, the present circuit amplifies an error signal present at summing point 22, until the output at terminal 16 substantially equals the input at terminal 20. The load, including the cathode ray tube plates, is capacitive, and the amplifier must frequently produce fast rise time output signals or spikes in order to charge the capacitive load. Thus, when a voltage step is received at terminal 20, the amplifier must provide sufficient output current whereby the load, e.g. comprising plates 10 and 14, is substantially immediately charged in response to the input change. At such time, an increased error signal between input and output occurs at point 22, and the amplifier is driven harder for producing a sufficient output or spike to drive and charge the capacitive load to the desired voltage.

As long as the input is of relatively small amplitude, and/or frequency or bandwidth, the small standing current provided to the output stage comprising transistors 42 and 46 through resistor 59 is sufficient to generate an output at plate 10 which linearly follows the input at terminal 20. For moderate short duration increases in frequency or bandwidth, and/or amplitude, the available average current from resistor 59 will be exceeded but the bypass capacitors designated $C_A$ and $C_B$ provide extra current to the load. For example, as the voltage drops at output terminal 16, current flows from plate 10 through resistor 18 and the collector of transistor 46, and then through the emitter of transistor 46 and resistor 48 to bypass capacitor $C_A$. Bypass capacitor $C_A$ then provides a path for additional output current as may be needed in the instance of a moderate signal frequency, and/or amplitude, increase. Similarly, as output terminal 16 rises in voltage, additional current may be provided from bypass capacitor $C_B$ through the base of transistor 42.

However, when the input frequency or bandwidth, and/or amplitude, increase appreciably, the available average current supplied through resistor 59 is exceeded and also capacitors $C_A$ and $C_B$ start to charge appreciably since they are no longer able effectively to provide the extra current needed. As a result, the average voltage at Y goes positive while the average voltage at X goes negative. When this occurs, the peak-to-peak voltage at X increases, this increase being in proportion to the sum of the changes at X and Y. Except for the aforementioned charging of the bypass capacitors, the peak-to-peak voltage at X which is under present discussion, would not appear to an appreciable extent. Normally the signal error voltage at X is fairly small in amplitude because the overall amplifier normally provides the correct output. When appreciable voltage swings occur at X, it is indicated that the amplifier is not in full control of the output. In the following discussion, the voltage at X will be taken to mean the aforementioned peak-to-peak voltage, being proportional to the change in charge across capacitors $C_A$ and $C_B$, and present when neither resistor 59 nor capacitors $C_A$ or $C_B$ provide the necessary current to linearly produce the correct amplifier output.

The voltage increase at X coupled via capacitor 62 to the base of transistor 64 causes this normally nonconducting transistor to conduct. Transistor 64 operates as a peak detector, and here comprises means responsive to electrical values in said amplifier, namely the values at point X related to the output of said amplifier in the illustrated embodiment. The voltage increase which is applied to the base of transistor 64 is remembered or stored on capacitor 68, connected to the emitter thereof, and the voltage across capacitor 68 is in effect coupled to capacitor 74 through transistor 72. Discharge of capacitor 68 through resistor 70 provides a decrease in current at the emitter of transistor 72 which in turn produces a positive going voltage at the collector of transistor 72. Such positive going voltage is also applied to the base of transistor 52 whereby transistor 52 is caused to conduct more current. As transistor 52 conducts more current, the bias voltage at the base of transistor 42 will be lowered and the bias voltage at the base of transistor 46 will be raised, causing transistors 42 and 46 to conduct more standing current. The additional standing current is actually procured through diode 60 which now conducts. Resistor 59 is relatively large and determines the normal small current through transistors 42 and 46, but when transistors 42 and 46 are biased to draw additional current, the additional current flows through diode 60, which, of course, has a relatively low resistance when conducting.

The circuit including transistor 72 comprises a negative feedback circuit for adjusting the bias on the output stage including transistors 42 and 46, whereby additional standing current is supplied the output stage as needed. Feedback control occurs since the peak-to-peak swing at X will decrease as the result of increased standing current. Capacitors 74 and 68 prevent the bias voltage from changing or dropping too rapidly by providing a time constant that is sufficiently long for such purpose. The feedback circuit is not a signal circuit, but is a signal level responsive circuit. The changes in bias are relatively independent of the signal handling function of the amplifier and do not affect the amplifier's ability effectively to reproduce the input signal under varying conditions of bias. Moreover, the use of feedback reduces the effect of component values and tolerances on the operation of the bias circuit.

The circuit is also arranged to maintain the correct or normal D.C. bias operating levels. The anode of diode 60 normally rests at a voltage whereby the diode is barely nonconducting. Transistor 64 is off and the collector and emitter resistances in circuit with transistor 72 cause a D.C. voltage to be applied to the base of transistor 52 such that transistor 52 is normally barely conducting. At this time, the base voltages of transistors 46 and 42 are set by transistor 52 so that transistors 46 and 42 will barely conduct. Sufficient current for transistor 46 in a barely conducting state is provided through high resistance, current determining resistor 59, without sufficient voltage drop being developed across resistor 59 to cause conduction of diode 60. Only when additional standing current is required through transistors 42 and 46 does diode 60 conduct appreciably.

While the circuitry according to the present invention is illustrated as applied, for example, to one vertical deflection plate of a cathode ray tube, it is understood that the same circuit is adaptable to driving other loads. Moreover, the circuit may be applied in push-pull fashion to drive both vertical deflection plates. In the latter instance, the circuit of FIG. 1, for example, would be substantially duplicated to provide a second similar circuit for operating in reverse phase, with plate 14 being connected to the last mentioned circuit rather than being grounded.

FIG. 2 illustrates a variation of portion of the FIG. 1 circuit wherein like elements are designated by like reference numerals. In this circuit, a voltage change at X, indicating inability of the output stage to provide a linear output, is again coupled by way of capacitor 62 to transistor 64 employed to detect the described condition. Again, transistor 64 drives capacitor 68 and transistor 72, but in this instance transistor 72 is coupled by way of PNP transistor 78 to an amplifier transistor 80 coupled in supply relation to the output stage. The emitter of transistor 78 is connected to a positive voltage while the collector voltage thereof is returned to negative voltage through resistor 82. The collector of transistor 80 is connected to a negative voltage and the emitter of transistor 80 is connected to point Y. Thus, transistor 80 is connected as an emitter follower to provide additional standing current to the output circuit, beyond that normally supplied through resistor 59. When an appreciable voltage change at X is present, indicating the output stage can no longer provide the desired drive to the load, transistor 64 conducts charging capacitor 68. The latter discharges through resistor 70 raising the potential at the emitter of transistor 72 and the potential at the collector of transistor 72 as connected to capacitor 74. The voltage rise causes decreased conduction through transistor 78, and therefore a drop in voltage at the collector of transistor 78. This drop, applied to the base of transistor 80, causes transistor 80 to provide increased standing current through the emitter thereof and to the amplifier output stage.

While I have shown and described preferred embodiments of my invention, it will be apparent to those skilled in the art that many changes and modifications may be made without departing from my invention in its broader aspects.

I claim:

1. A self-adaptive negative feedback amplifier normally operating at a low power level and responsive to increased power requirements, comprising:

a summing input, means for coupling an input signal to said summing input, a negative feedback circuit in said amplifier, coupled from the output of said amplifier to said summing input where a normally small error signal is developed by combining feedback with the input signal, said amplifier having an error signal path wherein said error signal is amplified for controlling the output of said amplifier to follow proportionally the input thereof, means normally biasing said amplifier to conduct a low standing current to provide substantially linear operation for normal signal conditions, means responsive to the signal amplitude in said error signal path for detecting an excessive signal level when said amplifier is providing insufficient output as the input signal exceeds the normal linear capabilities of the amplifier, and means responsive to said detection for increasing the standing current to said amplifier when said amplifier would otherwise not provide sufficient output.

2. The amplifier according to claim 1 wherein said responsive means for increasing the standing current comprises further bias feedback circuitry responsive to said error signal for changing the bias voltage normally applied to said amplifier, said change causing the standing current to be increased.

3. The amplifier according to claim 1 including bypass capacitor means through which short duration additional output current from said amplifier may be provided, said error signal becoming larger when said bypass capacitor means provides insufficient current.

4. The amplifier according to claim 1 wherein an output stage of said amplifier comprises a pair of complementary transistors having their collectors coupled in driving relation to the same output terminal, and wherein said transistors are normally biased so that one transistor is nonconducting when the other transistor conducts to a substantial extent in response to a given polarity of input signal, said transistors being driven in common so that they substantially alternately conduct in response to an alternating input signal.

5. An amplifier normally operating at a low power level and responsive to increased power requirements comprising:

an output stage including first and second controlled devices having principal current carrying paths interposed in circuit between supply terminals and the same output terminal, said controlled devices being normally biased to conduct a low standing current and biased such that one of said controlled devices is nonconducting when the other conducts to a substantial extent in response to input alternations applied to input terminals of said controlled devices, said output stage being provided with bypass capacitor means in circuit with at least one of said controlled devices, amplifying means driving said output stage, said amplifying means being provided with a summing input, negative feedback means coupled from the output of said output stage to said summing input, said amplifying means providing an error signal for application to said output stage, means for detecting an error signal increase at a terminal of one of said controlled devices as charging of said bypass capacitor means takes place, and means responsive to said detection in said last mentioned means for increasing the standing current to said output stage.

6. An amplifier normally operating at a low power level and responsive to increased power requirements comprising:

an output stage including a pair of complementary transistors having their collectors coupled in driving relation to the same output terminal, said transistors being normally biased to conduct a low standing current and biased such that one of said transistors is nonconducting when the other conducts to a substantial extent in response to input alternations applied to input terminals of said transistors, said output stage being provided with bypass capacitor means in circuit with at least one of said transistors, amplifying means driving said output stage, said amplifying means being provided with a summing input, negative feedback means coupled from the output of said output stage to said summing input, means for detecting a voltage increase at a terminal of one of said transistors as a result of charging of said bypass capacitor means, and means responsive to said detection in said last mentioned means for increasing the standing current to said output stage.

7. The amplifier according to claim 6 wherein a first bypass capacitor is coupled between base input terminals of said complementary transistors, and including a high resistance source coupled to an emitter terminal of one of said complementary transistors, a second bypass capacitor coupled to such emitter terminal, and a diode coupled in shunt relation to said high resistance source between such source and a point of reference potential through which extra current can be coupled to such emitter terminal.

8. An amplifier normally operating at a low power level and responsive to increased power requirements comprising:

an output stage including first and second controlled devices having principal current carrying paths interposed in circuit between supply terminals and the same output terminal, said controlled devices being normally biased to conduct a low standing current and biased such that one of said controlled devices is nonconducting when the other conducts to a substantial extent in response to input alternations applied to input terminals of said controlled devices, said output stage being provided with bypass capacitor means in circuit with at least one of said controlled devices, amplifying means for driving said output stage, said amplifying means being provided with a summing input, negative feedback means coupled from the output of said output stage to said summing input, means for detecting a voltage increase at a terminal of one of said controlled devices as a result of charging of said bypass capacitor means, said means for detecting a voltage increase comprising an amplifier circuit coupled to receive an input from the last mentioned terminal, and a third controlled device coupled between the input terminals of the first and second controlled devices, and said amplifier circuit being coupled in driving relation to said third controlled device for varying the bias at the input terminals of the first and second controlled devices in response to charge of said bypass capacitor means.

9. The amplifier according to claim 8 wherein said first and second controlled devices comprise complementary transistors having their collectors connected to the same output terminal, and wherein said third controlled device comprises a third transistor having its collector-emitter path coupled between the base terminals of said complementary transistors, said third transistor being supplied a current so that operation of said third transistor in response to input applied thereto alters the bias at the bases of said complementary transistors.

10. An amplifier normally operating at a low power level and responsive to increased power requirements comprising:

an output stage including first and second controlled devices having principal current carrying paths interposed in circuit between supply terminals and the same output terminal, said controlled devices being normally biased to conduct a low standing current and biased such that one of said controlled devices is nonconducting when the other conducts to a substantial extent in response to input alternations applied to input terminals of said controlled devices, said output stage being provided with bypass capacitor means in circuit with at least one of said controlled devices, amplifying means driving said output stage, said amplifying means being provided with a summing input, negative feedback means coupled from the output of said output stage to said summing input, and means for detecting a voltage increase at a terminal of one of said controlled devices as a result of charging of said bypass capacitor means, said means for detecting comprising an amplifier coupled to receive an input from such terminal and coupled in current supplying relation to said first and second controlled devices.

References Cited

UNITED STATES PATENTS 3,319,175 5/1967 Kramer ---------- 330—123 X
3,381,235 4/1968 Campbell ---------- 330—22 X

OTHER REFERENCES

"Transistorized 6-Watt Hi-Fi," Radio-Electronics, August 1957, p. 108.

ROY LAKE, Primary Examiner

J. B. MULLINS, Assistant Examiner

U.S. Cl. X.R.

330—17, 22, 28, 29